July 18, 1950     D. W. LEVENSON     2,516,060
RADAR TEST EQUIPMENT
Filed May 21, 1946     2 Sheets-Sheet 1
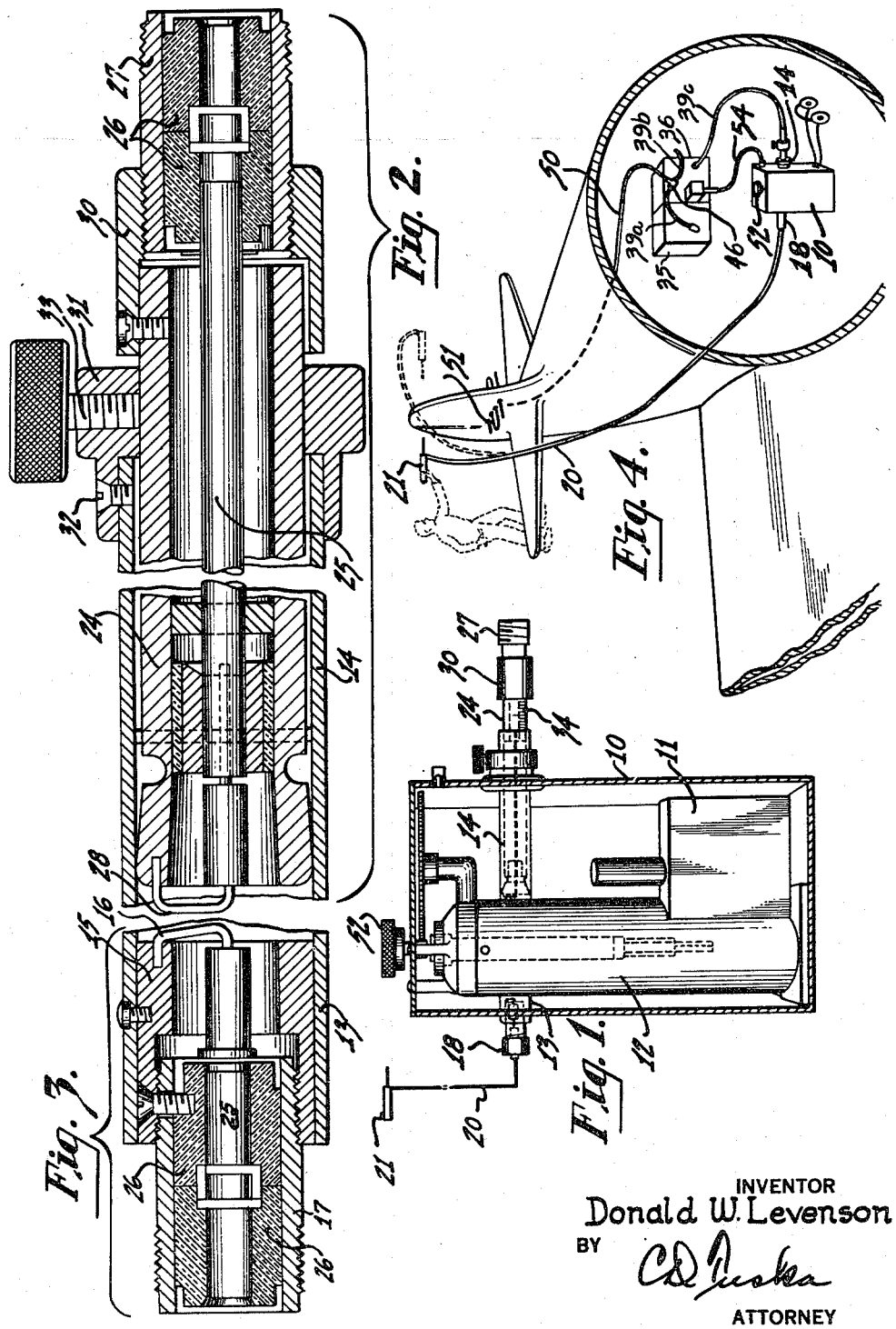
INVENTOR
Donald W. Levenson
BY
ATTORNEY July 18, 1950 D. W. LEVENSON 2,516,060
RADAR TEST EQUIPMENT
Filed May 21, 1946 2 Sheets-Sheet 2
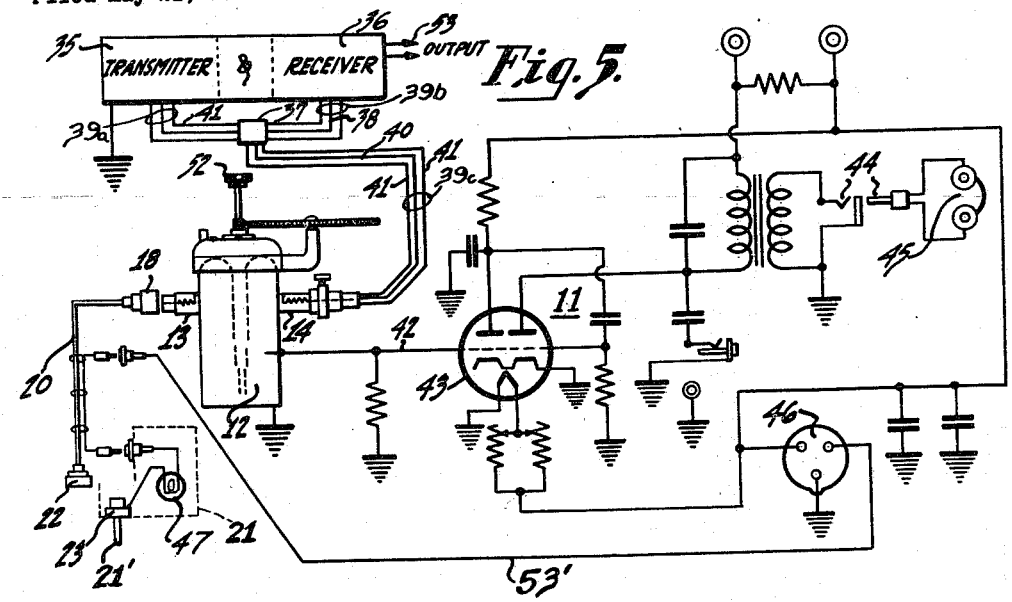
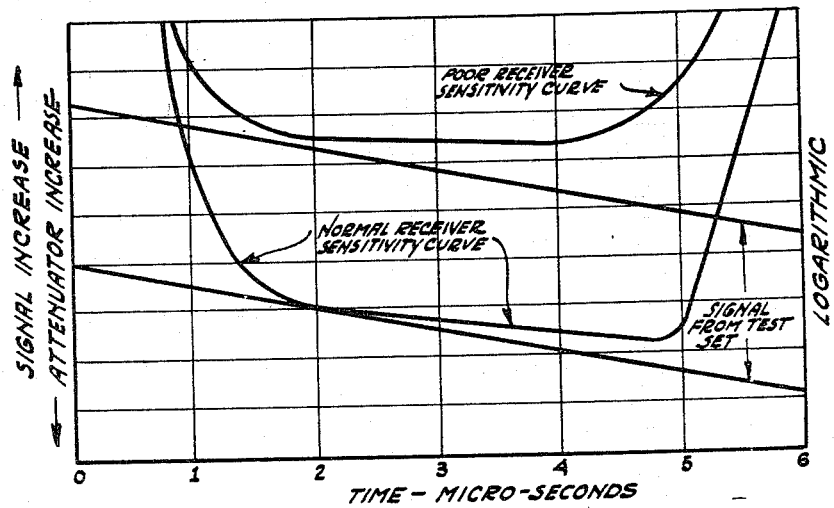
INVENTOR
Donald W. Levenson
BY
ATTORNEY Patented July 18, 1950

2,516,060

UNITED STATES PATENT OFFICE 2,516,060

RADAR TEST-EQUIPMENT

Donald W. Levenson, Camden, N. J., assignor to Radio Corporation of America, a corporation of Delaware Application May 21, 1946, Serial No. 671,199

2 Claims. (Cl. 343—5)

The present invention relates to testing equipment and more particularly to a method and system of checking the sensitivity of airborne radar installations.

An object of the present invention is to provide an improved method and apparatus for testing radar equipment.

Another object of the invention is to provide a novel system for testing pulse radar transmitting and receiving apparatus.

A further object of the invention is to provide means for testing the antenna output of a pulse radar transmitting apparatus.

A still further object of the invention is to provide a system for testing both the antenna output of a pulse radar transmitting apparatus and the sensitivity of the pulse radar receiving equipment installed on aircraft, and operated under conditions corresponding to flight conditions but without requiring an actual flight.

In the accompanying drawings Fig. 1 represents a sectional elevation of a portable case showing a cavity resonator and associated parts embodying one aspect of the present invention; Figure 2 represents a longitudinal section of an attenuator and coupling unit of one type employed in the system of the invention; Figure 3 represents a longitudinal section of an antenna coupling unit employed in the system; Figure 4 represents a fragmentary perspective of the rudder and antenna portion of an airplane showing one operative assembly of the invention; Figure 5 represents a circuit diagram of the system of the invention and showing the pulse radar transmitter and receiver as connected for testing the sensitivity of the equipment on an airplane; and Figure 6 represents graphs showing the results of sensitivity tests.

Referring to the drawings one form of the present invention comprises a case 10 arranged to house a detector amplifier unit 11 in operative association with a cavity resonator 12, here shown as of the cylindrical type having an antenna input receptacle 13 and an apparatus input receptacle 14 arranged respectively at opposite sides of the resonator 12 in aligned relation, although it is not essential that the two receptacles be in alignment.

The antenna input receptacle 13 serves as a mounting for the antenna coupling unit 15 (see Fig. 3), which includes a coupling loop 16 and threaded tubular extension 17 for attaching the removable fitting 18 (Fig. 1) which forms the terminal of a coaxial cable 20 leading directly to a probe antenna housing 21. As shown in Fig. 5, a socket 22 on the end of the cable 20 is adapted to fit a plug 23 in the housing 21 of the probe antenna 21'.

The apparatus input receptacle 14 (Fig. 2) is in the form of an elongated tube to receive and slidably support an attenuator as the terminal of a transmission line, such terminal comprising a tubular outer conductor 24 and an inner coaxial conductor rod 25 insulated at its outer end by insulating bushings 26 from the end externally threaded nipple 27, and at its inner end being terminated by a coupling loop 28. The nipple 27 is threaded into a sleeve 30 and the latter attached to the slide conductor 24.

In order to lock the attenuator in any adjusted position, a locking collar 31 encircles the slide conductor 24 and is secured by a screw 32 or the like. A thumb screw 33 is threaded through the collar 31 to engage the slide conductor 24 for locking purposes and when loosened frees the slide for movement axially of the receptacle 14 in order to obtain the desired attenuation and to make desired sensitivity tests. It shoult be noted that the outer face of the slide conductor 24 is graduated (see Fig. 1), in this instance, in decibels to form a scale 34 so calibrated as to locate its zero point coincident with the plane of the outer face of the collar 31.

The apparatus of the invention as shown in Figure 5 is arranged for testing a receiver or both the transmitter and receiver on an airplane or the like. As is usual, the transmitter 35 and the receiver 36, generally in the same housing, are interconnected by a coaxial cable 39a, 39b through a junction box 37 wherein the transmitter and receiver are ordinarily connected in common to an antenna (not shown in Fig. 5). Each portion of the cable on the respective sides of the junction box 37 is properly related in length as is known to those skilled in the art. In Fig. 5, the usual connection from the junction box 37 to the radar system antenna is replaced by a connection from the junction box 37 to the test equipment of the invention. The cables 39a, 39b include an inner conductor 38 leading from the transmitter to the receiver, with a tap conductor 40 in the cable 39c leading to the inner conductor 25 within the insulating bushings 26 of the attenuator, and outer conductors 41 also interconnecting the transmitter, the receiver, and the attenuator, the last through the nipple 27 and slide conductor 24. The output 53 from the receiver leads to a warning bell, light, meter or other indicator (not shown) which ordinarily serves the pilot of the aircraft in which the radar equipment is located and also serves as a check when adjusting the attenuator in the test set of the invention.

An output coupling element 42' (similar to element 16 in Fig. 2) is also provided to furnish signals from the cavity resonator 12 to a detector-amplifier in the form of a twin triode tube 43 by way of a conductor 42. The tube 43 forms a part of a circuit which indicates the transmitter operation and the resonator operation, and also serves to indicate the adjustment of the resonator. The indicator circuit includes a jack 44 for a set of head phones 45. Other indicating means can be substituted for such head phones if desired. A plug 46 is arranged to connect to a power supply unit (not shown) in the transmitter-receiver, to provide power for the detector-amplifying unit 11 of the resonator 12. The plug 46 also connects the output 53 of the receiver to a lamp 47, which latter is preferably mounted in the probe antenna housing 21. The lamp 47 provides an indication of operation of the warning system for personnel using the probe antenna at a distance from the radar system indicator.

As shown in Fig. 4, when the test system of the invention is to be used for checking the antenna radiation of an airborne craft the receiver 36 is disconnected from the junction box 37 and is connected directly to the attenuator by a co-axial cable 48, while a cable 50 leads from the junction box 37 to the aircraft antenna 51 as usual when the aircraft is in flight. The cable 20 of the probe antenna 21 is connected to the input receptacle 13 of the test unit 10 by means of the fitting 18. The plug 46 is connected to furnish power from the transmitter-receiver power unit to the resonator unit 11 by a cable 54 which also connects the lamp 47 (Fig. 5) to the receiver output 53. Thus the radio frequency power is applied from the transmitter to the aircraft antenna 51, and after being picked up by the probe 21 is applied to the cavity resonator 12 and thence to the receiver 36.

In explaining the operation of the respective tests it should be noted that one form of pulse radar transmitter-receiver unit to which the invention applies is the U. S. Army and Navy Unit RT-34/APS-13, or Radio Set AN/APS-13, which is of the type wherein the receiver is insensitive for a short period of time after a pulse is transmitted, and then becomes sensitive to receive reflected pulses.

In the operation of the test system of the present invention and particularly to test for transmitter and receiver operation, as well as to measure the sensitivity of the receiver, the system is connected as shown in Fig. 5 with the resonator 12 connected through the cables 39a, 39b, 39c and the receptacle 14 to both the transmitter and the receiver, while the probe antenna is disconnected from the antenna input receptacle 13. Assuming that the equipment to be tested is generating pulses of radio frequency energy at an audible frequency rate, the operator by listening on the ear phones 45 can determine that the transmitter is operating at the proper carrier frequency by pushing the attenuator slide 24 in (to the left as shown in Fig. 2) and turning the resonator frequency control knob 52 for the maximum audio response of the headset. The signal will appear to be broad so a more accurate indication may be obtained by increasing the attenuator insertion loss by pulling out (to the right as shown in Fig. 2) until the signal is just bearly audible. With the resonator properly tuned and the transmitter generating pulses of radio frequency energy, the receiver can be checked by applying to the receiver the currents from the wave train which is developed by shock excitation of the resonator.

The receiver sensitivity check consists of pulling the attenuator slide 24 all the way out at which time no warning signal will appear at the output 53 of the receiver 36. The slide 24 is now pushed in until the warning signal at the output 53 is in operation whereupon the reading on the scale 34 should be the same as that determined by a calibrated standard predetermined from a system known to be functioning properly. By reference to Figure 6 it will be seen that the transmitted pulse excites the resonator and the signal from the resonator decreases at a constant rate. Where the signal from the test set intersects the receiver sensitivity curve the warning system will operate. If the receiver has poor sensitivity, the decay curve intersects the receiver sensitivity curve at a lower attenuator setting. The difference between an effective set and an ineffective one will be indicated by a difference in the reading on the attenuator slide 24 of the test set.

In order to check the antenna radiation, the testing apparatus is connected as shown in Figure 4, in which case the probe cable 20 is plugged into the resonator input receptacle 13 and the receiver 36 is connected to receive input signals from the receptacle 14 of the test set 10. One operator now carries the probe antenna 21 to a point adjacent the rudder of the air ship and holds it in a horizontal position parallel to the antenna system of the air ship. The operator checks the antenna system from both sides of the rudder and during each check an operator at the aircraft manipulates the attenuator slide 24 until the warning output 53 operates, thus indicating that the system is functioning properly. Note, it is possible to preset the attenuator slide at some specific value and judge system sensitivity by noting when the warning light 47 in the probe housing 21 goes off as the operator walks away from the plane holding the probe parallel to the ship's antenna.

The reason for checking both sides of the rudder is to make certain that the two sides of the antenna are radiating. Thus the system may be used to indicate that the transmitter is operating: that the receiver has the required sensitivity: that both the receiver and transmitter are operating, and that the transmitter-receiver system has the required sensitivity.

I claim as my invention:

1. Apparatus for testing a pulse radar system of the type including a transmitter, a receiver and indicator to receive and indicate reception of reflected signals originating at said transmitter, an antenna, and coupling means coupling said antenna to said transmitter and to said receiver to radiate signals generated by said transmitter and to supply picked up signals to said receiver, said apparatus comprising a cavity resonator, an attenuator including a coupling element mounted on said resonator and extending a calibrated variable distance into the cavity of said resonator to apply determinable amounts of energy to and pick up determinable amounts of energy from said resonator, means to couple said attenuator to said transmitter and receiver to apply controllable amounts of energy from said transmitter to said resonator through said attenuator and to apply controllable amounts of energy from said resonator through said attenuator to said receiver to actuate said receiver and indicator whereby to obtain a measurement of the sensitivity of said receiver from the setting of said calibrated element, a fixed coupling element mounted on and extending into the cavity of said resonator to pick up energy from said resonator, and a detecting and indicating network connected to said fixed coupling element to indicate energization of said resonator and, hence, of said transmitter independently of and concurrently with operation of said receiver.

2. Apparatus as defined in claim 1 including a second fixed coupling element mounted on and extending into the cavity of said resonator to apply energy to said resonator, an antenna connected to said second fixed coupling element to pick up energy radiated from said radar system antenna and supply said energy to said resonator to check the operation of said radar system antenna.

DONALD W. LEVENSON.

REFERENCES CITED

The following references are of record in the file of this patent:

UNITED STATES PATENTS

| Number | Name | Date |
|---|---|---|
| 2,420,211 | Tourshou | May 6, 1947 |
| 2,421,016 | Deloraine | May 27, 1947 |
| 2,433,868 | Sensiper | Jan. 6, 1948 |

OTHER REFERENCES

Radio Amateur's Handbook, 1942. Published by American Radio Relay League. Special Defense edition. Pages 243 and 244.

AIEE Technical Paper 46-40, January, 1946, pages 15 and 16.